June 17, 1930.                C. A. FARON                1,764,069
                          FLOAT OPERATED SWITCH
                          Filed Aug. 28, 1923
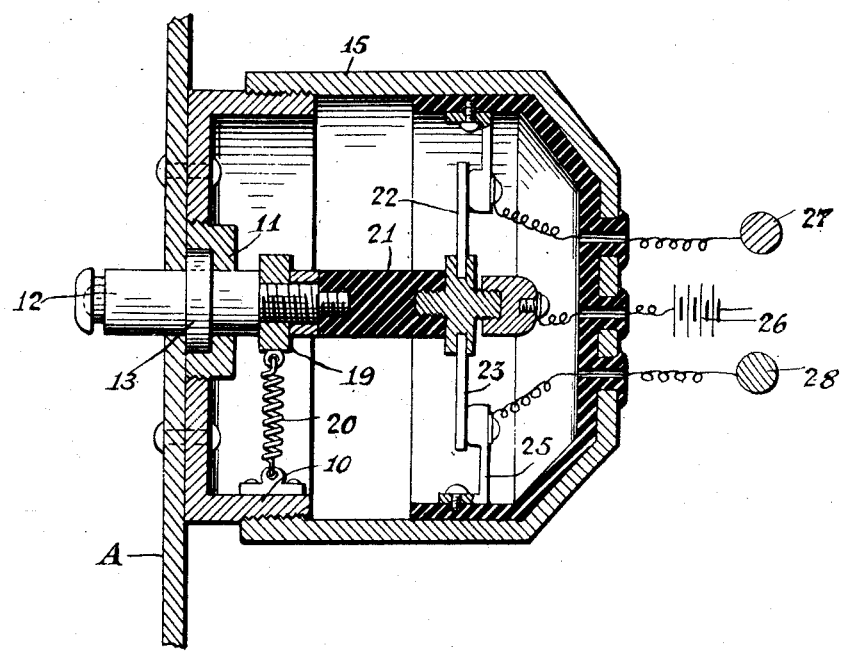
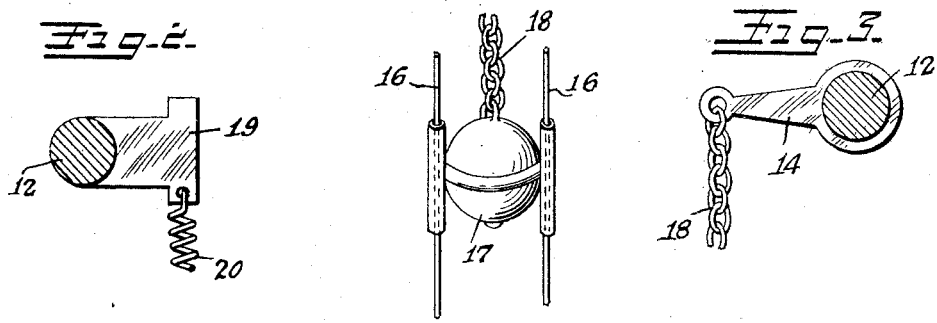
Inventor:
CLIFFORD A. FARON.

Patented June 17, 1930

1,764,069

UNITED STATES PATENT OFFICE

CLIFTON ALVADE FARON, OF LOS ANGELES, CALIFORNIA

FLOAT-OPERATED SWITCH

Application filed August 28, 1923. Serial No. 659,903.

This invention relates to float operated switches for use in connection with liquid storage receptacles, and has for its general object to provide a novel combination and arrangement of parts whereby falling of the liquid in a receptacle to a predetermined level will cause actuation of the switch to close a signal circuit.

More particularly, the object of the invention is to provide a simple, inexpensive and reliable float operated switch inclusive of parts so constructed and arranged that a circuit will be closed to actuate one signal when the liquid in a tank falls to a predetermined level, and upon falling of the liquid to a lower level a circuit will be closed to actuate another signal.

With the above and other objects in view, the invention consists in the novel combination, association and relative arrangement of parts, members and features, all as herein described, shown in the drawings and finally pointed out in claims.

Fig. 1 is a longitudinal section through the device.

Figure 2 is a cross-sectional view of the operating shaft of the device.

Fig. 3 is a detail end view of the operating shaft; and

Figure 4 is a detail view showing the manner of mounting the float.

Corresponding parts in all figures are designated by the same reference characters.

Referring to the drawings, A designates a side wall portion of a liquid storage receptacle such, for example, as the fuel storage tank of a motor vehicle, said wall, in accordance with the invention, having suitably secured thereto a flange member 10.

A bearing 11 is carried by the member 10 and within said bearing is rotatably mounted a horizontal shaft 12, held against longitudinal movement by means of a collar 13 thereon seated in a recess in said bearing.

One end of the shaft 12 extends through an opening in the wall A into the tank and carries a lever arm 14, while the other end of said shaft extends into a housing 15 detachably mounted on the member 10.

Within the tank is mounted a pair of rods 16 providing guide means for a float 17 which is connected by a flexible element 18 with the lever arm 14.

Interiorly of the housing 15 the shaft 12 carries an arm 19 which is connected with the member 10 by a coil spring 20, so that when the lever arm 14 is relieved of the weight of the float 17 as when the level of the liquid in the tank rises, the shaft is rotated to a predetermined position by said spring, the latter being sufficiently light so that when the level of the liquid drops the weight of the float will overcome said spring and rotate the shaft in an opposite direction.

Carried by the end of the shaft 12 within the housing 15 is an insulating member 21 which has secured thereto a pair of radially disposed switch arms 22 and 23 adapted, by rotation of the shaft 17, to be moved into and from engagement with a pair of contacts 24 and 25, respectively, carried by and suitably insulated from the housing 15.

At 26 is indicated a battery to furnish current for illuminating a pair of signal lamps 27 and 28 which latter may be colored green and red, respectively. From one terminal of the first of said lamps a conductor leads to and is connected with the contact 24, while from one terminal of the other of said lamps, 28, a conductor leads to and is connected with the contact 25. One pole of the battery is suitably connected with the switch arms 22, 23 while the other pole thereof is connected with the second terminal of each of the signal lamps.

The switch arms 22, 23 and the contacts 24, 25 are so disposed relative to one another that when the liquid in the tank and consequently the float 17 is above a predetermined low level, the switch arms are disengaged from the contacts; and that rotation of the shaft 12 in a direction as effected by lowering of the float 17 below said predetermined low level results first in the switch arm 22 engaging the contact 24 and, by further lowering of the float, in the switch arm 23 engaging the contact 25. Thus, as is manifest, upon the liquid in the tank falling to a predetermined level, a circuit is completed from the battery through the lamp 27 to serve as an initial warning that the liquid in the tank is approaching an undesirable low level, while upon further falling of the level of the liquid, a circuit is completed from the battery through the lamp 28 as a warning that the unsatisfactory low level has been reached.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A float operated circuit closer, including a support, an oscillatory shaft journaled in said support and having a radially offset arm actuated by the float, a coil spring also disposed radially of the shaft and connected thereto to normally tension the same against the action of the float, an insulated section carried by the end of the shaft, a battery connected contact carried by said insulated section and having spaced radially disposed arms, a housing having an insulated inside covering and fitted to said support, and signal contacts carried on said insulated inside cover and adapted to be engaged by the arms of the battery contact.

2. A float operated circuit closer, including a flanged base, a shaft journaled in said base and having a radially offset arm exteriorly of the base actuated by the float, a coil spring also disposed radially of the shaft and connected thereto to normally tension the same against the action of the float, an insulated section carried by the end of the shaft, a metallic battery connected contact having spaced radially disposed arms carried by the end of said insulated section, and a housing having an inside insulated covering and detachably fitted to the flanged base, and signal contacts carried on the said insulated inside covering and adapted to be engaged by the arms of the battery contact.

CLIFTON ALVADE FARON.